US010606991B2

(12) United States Patent
Brison et al.

(10) Patent No.: US 10,606,991 B2
(45) Date of Patent: Mar. 31, 2020

(54) DISTRIBUTED USER-CENTRIC CYBER SECURITY FOR ONLINE-SERVICES (71) Applicant: LOGDOG INFORMATION SECURITY LTD., Tel Aviv (IL)

(72) Inventors: Uri Brison, Tel Aviv (IL); Shlomi Cohen, Tel Aviv (IL); Alon Keren, Tel Aviv (IL); Omri Topol, Tel Aviv (IL)

(73) Assignee: Logdog Information Security Ltd., Tel Aviv (IL)

( * ) Notice: Subject to any disclaimer, the term of this patent is extended or adjusted under 35 U.S.C. 154(b) by 0 days.

(21) Appl. No.: 16/312,712

(22) PCT Filed: May 29, 2017

(86) PCT No.: PCT/IB2017/053144
§ 371 (c)(1),
(2) Date: Dec. 21, 2018

(87) PCT Pub. No.: WO2017/221088
PCT Pub. Date: Dec. 28, 2017

(65) Prior Publication Data
US 2019/0220580 A1 Jul. 18, 2019

Related U.S. Application Data (60) Provisional application No. 62/353,585, filed on Jun. 23, 2016.

(51) Int. Cl.
G06F 21/31 (2013.01)
G06F 21/00 (2013.01)
(Continued)

(52) U.S. Cl.
CPC .......... G06F 21/316 (2013.01); G06F 21/00 (2013.01); G06F 21/45 (2013.01); G06F 21/552 (2013.01);
(Continued)

(58) Field of Classification Search
CPC ...... G06F 21/53; G06F 21/552; G06F 21/577; G06F 2221/2101; G06F 21/00;
(Continued)

(56) References Cited

U.S. PATENT DOCUMENTS 9,185,095 B1 11/2015 Moritz et al.
2010/0077481 A1* 3/2010 Polyakov ............. G06F 21/552
726/24

(Continued)

OTHER PUBLICATIONS

International Search Report and Written Opinion for Application No. PCT/IB2017/053144 dated Aug. 30, 2017, 7 pages.
(Continued)

Primary Examiner — Abiy Getachew
(74) Attorney, Agent, or Firm — Alston & Bird LLP (57) ABSTRACT A user-centric cyber security system, comprising: a plurality of DAAs (Data Acquisition Agents) configured to collect data from a plurality of user's OSPs (Online Service Providers) and from a plurality of user devices; and a system server communicating with said plurality of DAAs, said system server configured to receive said collected data from said plurality of DAAs, analyze said data for threats to said user, alert said user accordingly, receiving feedback from said user regarding said alert and improve said threat analysis using said user's feedback.

41 Claims, 5 Drawing Sheets (51) Int. Cl.
*G06F 21/45* (2013.01)
*G06F 21/55* (2013.01)
*G06F 21/56* (2013.01)
*H04L 12/24* (2006.01)
*H04L 29/06* (2006.01)

(52) U.S. Cl.
CPC .............. *G06F 21/56* (2013.01); *H04L 41/06* (2013.01); *H04L 63/1416* (2013.01); *H04L 63/20* (2013.01)

(58) Field of Classification Search
CPC ........ G06F 21/316; G06F 21/45; G06F 21/56; H04Q 9/00; G01S 7/021; G01S 7/36; G01S 19/18; G01S 7/003; G01S 7/295; G01S 7/38; G09B 19/165; H04L 41/06; H04L 63/1416; H04L 63/20
See application file for complete search history.

(56) References Cited

U.S. PATENT DOCUMENTS

2013/0291099 A1\* 10/2013 Donfried ............ G06Q 30/0637
726/22
2015/0310195 A1 10/2015 Bailor et al.

OTHER PUBLICATIONS

International Preliminary Report on Patentability for Application No. PCT/IB2017/053144 dated Aug. 16, 2018, 10 pages.

\* cited by examiner

DISTRIBUTED USER-CENTRIC CYBER SECURITY FOR ONLINE-SERVICES

CROSS-REFERENCE TO RELATED PATENT APPLICATIONS

This patent application is a National Stage of International Application No. PCT/IB2017/053144, filed May 29, 2017, which claims priority from and is related to U.S. Provisional Patent Application Ser. No. 62/353,585, filed 23 Jun. 2016, this U.S. Provisional Patent Application and International Application are incorporated by reference in their entirety herein.

FIELD OF THE INVENTION

The invention is related to user-centric protection of user accounts from unauthorized access.

BACKGROUND

Data security is a major concern of organizations and numerous solutions have been developed to effect cyber security for servers storing organization data and for applications used by organization's employees such as e-mail, file servers etc.

Private users' data on the other hand is much less protected, since it is distributed over the cloud. The existing security is application-centric, namely, the security of each operation the user does in an online-service depends on the security means of that specific service and has no bearing to other operations done by the user.

An example of an online service is a social network platform enabling users to communicate and share content with peers. Another example of an online service is a platform which a bank offers to customers to perform actions in their accounts (check balance, transfer money, etc.).

In the past, people could protect their private data by installing security software on their PCs. Today most people have more private data in online accounts than on their private PCs and mobile devices.

To effectuate the use of an online service, a user is typically required to create an account to which they or their device (computer, mobile phone, etc.) must log in every time they wish to access the service. To log into a service, the user is typically required to provide a user name and password which they set up during account creation as means of authentication. Unfortunately, there are deficiencies in user name and password based authentication mechanisms. A hacker can learn in various methods the user name and password combination of a user and abuse them to take over the account.

The conventional approach for protecting user accounts consists of every service provider tracking the characteristics of user logins and activities. When a suspicious login or activity is detected by the service provider they can either warn the user by E-mail, require another step of authentication, or block the login or action attempt.

SUMMARY

According to a first aspect of the present invention there is provided a user-centric cyber security system, comprising: a plurality of DAAs (Data Acquisition Agents) configured to collect data from a plurality of user's OSPs (Online Service Providers) and from a plurality of electronic user communication devices; and a system server communicating with said plurality of DAAs, said system server configured to receive said collected data from said plurality of DAAs, analyze said data for threats to said user, alert said user accordingly, receive feedback from said user regarding said alert and improve said threat analysis using said user's feedback.

The system server may comprise: a CTAS (Cyber Threats Analysis System) configured to analyze said data and to determine whether it introduces a threat to said user's account or data; and a Threat Broker configured to determine a course of action relating to a determined threat.

The course of action may comprise informing the user about the threat that his accounts and data are facing through at least one User Interface.

The said at least one User Interface may be selected from the group consisting of software client on a mobile device, software client on a PC and Web client interface.

The course of action may be selected from the group consisting of informing at least one of said user's OSPs (Online Service Providers), informing an IT (Information Technology) and informing a security specialist.

The Threat Broker may further be configured to offer remediation steps to said user.

The remediation steps may be selected from the group consisting of changing OSP's password, closing all active connections to the OSP and reporting the threat to the OSP.

The data collected by said DAAs may be selected from the group consisting of user activities in his accounts, user's stored data in the accounts and user's accounts settings.

The data collected by said DAAs may comprise at least one of session data, behavioral data and content data.

The session data may comprise at least one of IPs (Internet Protocols) used to login to the OSPs, locations the OSPs were logged from, devices used to login to the OSPs and browser types and signatures that were used to login to the OSPs.

The behavioral data may comprise at least one of usual time of activities in the OSPs, average activities count per time frame, rules the user enforced on the OSPs and languages used by the user when interacting with the OSPs.

The content data may comprise at least one of template of malicious posts in the OSPs, malicious URLs found in content of the OSPs and malicious files found in the OSPs.

The system server may comprise a User Profiles database, a Cross User's database and an External Intelligence database.

The user profiles database may be continuously updated and may comprise at least one user characteristic selected from user's typical IPs, user's typical browsers, user's typical devices, user's typical activity times on the OSPs, user's typical posts and user's typical sequence of actions in the OSP.

The user profiles database may comprise profile data specific for each one of said plurality of OSPs and a cross OSPs profile data.

Each one of said at least one user characteristic may comprise a weight representing the degree to which said characteristic matches the user's identity and behavior.

Analyzing may comprise finding similarities and/or discrepancies between the characteristics received and deduced from a DAA data and the characteristics residing in the User Profile.

The Cross User database may be continuously updated and may comprise generalized characteristics applicable to a group of similar users.

The External Intelligence database may comprise external sources from which the system collects and aggregates known threats to users' online accounts and data.

The known threats may be selected from the group consisting of: malicious hosts IPs, anonymous proxy nodes, malicious URLs, phishing and scam mail templates and known malicious files signatures.

The at least one of said plurality of DAAs may be deployed on the user's devices as a part of a user application.

At least one of said plurality of DAAs may be deployed on a user's OSP.

At least one of said plurality of DAAs may be deployed on a remote server.

According to another aspect of the present invention there is provided a method of providing user-centric cyber security, comprising: receiving from at least one DAA (Data Acquisition Agents) raw data collected from at least one user's OSPs (Online Service Providers) and from at least one user's electronic communication device; analyzing said data for threats to said user; and if said analysis indicates that the data is inconsistent with a stored profile of said user, generating a threat alert to said user's device; receiving feedback from said user regarding said threat alert; and improving said threat analysis using said user's feedback.

Analyzing may comprise: using said user's profile to normalize said received raw data; using external sources to enrich said normalized data; and comparing said enriched data to said user's profile.

The method may further comprise comparing said enriched data to a Cross User database.

The method may further comprise updating said user's profile according to said feedback.

The method may further comprise comparing said enriched data to other users aggregated data.

The method may further comprise determining a course of action relating to a determined threat.

The course of action may comprise informing the user about the threat that his accounts and data are facing through at least one User Interface.

The at least one User Interface may be selected from the group consisting of software client on a mobile device, software client on a PC and Web client interface.

The course of action may be selected from the group consisting of informing at least one of said user's OSPs, informing an IT (Information Technology) and informing a security specialist.

The method may further comprise offering remediation steps to said user.

The remediation steps may be selected from the group consisting of changing OSP's password, closing all active connections to the OSP and reporting the threat to the OSP.

The received data may be selected from the group consisting of user activities in his accounts, user's stored data in the accounts and user's accounts settings.

The data may be collected from said user's electronic communication devices.

The data may comprise at least one of session data, behavioral data and content data.

The session data may comprise at least one of IPs used to login to the OSPs, locations the OSPs were logged from, devices used to login to the OSPs and browser types and signatures that were used to login to the OSPs.

The behavioral data may comprise at least one of usual time of activities in the OSPs, average activities count per time frame, rules the user enforced on the OSPs and languages used by the user when interacting with the OSPs.

The content data may comprise at least one of template of malicious posts in the OSPs, malicious URLs found in content of the OSPs and malicious files found in the OSPs.

According to another aspect of the present invention there are provided one or more computer-storage media embedded with computer-executable instructions, the embedded computer-executable instructions are executed by at least one processor for performing a method of providing user-centric cyber security, comprising: receiving from at least one DAA (Data Acquisition Agents) raw data collected from at least one user's OSPs (Online Service Providers) and from at least one user's device; analyzing said data for threats to said user; and if said analysis indicates that the data is inconsistent with a stored profile of said user, generating a threat alert to said user's device; receiving feedback from said user regarding said threat alert; and improving said threat analysis using said user's feedback.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF EMBODIMENTS

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagram in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention provides a solution to the above-described conventional approach that protected user accounts from unauthorized access by tracking user characteristics by the service provider.

The new paradigm presented by the present invention is that of user-centric (rather than application-centric) cyber security.

The improved technique of the present invention is to acquire data from multiple services using a distributed system in order to generate cyber security threat alerts and warnings for both individuals and organizations. The data is acquired from a user's services automatically, using software installed on one or more devices typically owned by the user that is associated with the online services or an organization they belong to. Acquired data may include device information (e.g. the type of PC or mobile phone, the operating system and browser being used, etc.), behavioral information (e.g. typical hours the user logs into the service), as well as specific actions performed in the service (e.g. issuing a money transfer).

The technique also includes a server or servers, which receive the acquired data from the devices and perform various types of analyses on the acquired data in order to generate the cyber security threat alerts and warnings. The analyses can look into data of a single user across multiple services, or data which appears across multiple users.

The technique also includes the software installed on the devices to be able to present users with the generated cyber security threat alerts and warnings. The technique also includes the ability to display feedback options to the user when presenting an alert and/or warning. The feedback is sent back to the server and can be used to improve the analysis of the data or trigger any other action based on the information.

The data is acquired by agents that can exist in the software installed on the devices, in servers, or on the online service itself. The agent can pull the data from the online service or push data from the online service to the server or servers, which receive the acquired data.

Such a technique of a distributed data acquisition system for the generation of cyber security threat alerts and warnings has the ability to see into a user's activity across multiple services and resources. The conventional approach is limited in its ability to see into a user's activity, as it is implemented by each service provider that only have visibility to the user data on their service.

Implementations are directed to the following:

Acquiring data can include requiring the user to provide the user name and password of the user to the online service from which they are interested in acquiring data. The user name and password are used by the software to periodically and automatically access the service on behalf of the user to acquire the relevant data. The user name and password can be stored in the device as an access token, which online services provide to third party systems to enable them access on behalf of their users. Acquiring data can include the normalization of data before sending it to the central server.

Data analysis can include the importation, normalization and storage of data from a variety of sources. An example of a data source is the device on which the software is installed. Another example is threat intelligence (e.g. IP addresses of known hackers, compromised accounts) obtained from third party vendors. Data added to the system can be automatically enriched with additional data, by communicating with third party sources (e.g. geo-location of IP addresses). The analysis can classify detected suspicious activity based on severity level, and generate alerts and warnings based on the threat characteristics. The analysis can be performed in real time (when new data is added) and on historical data.

Figure 1:
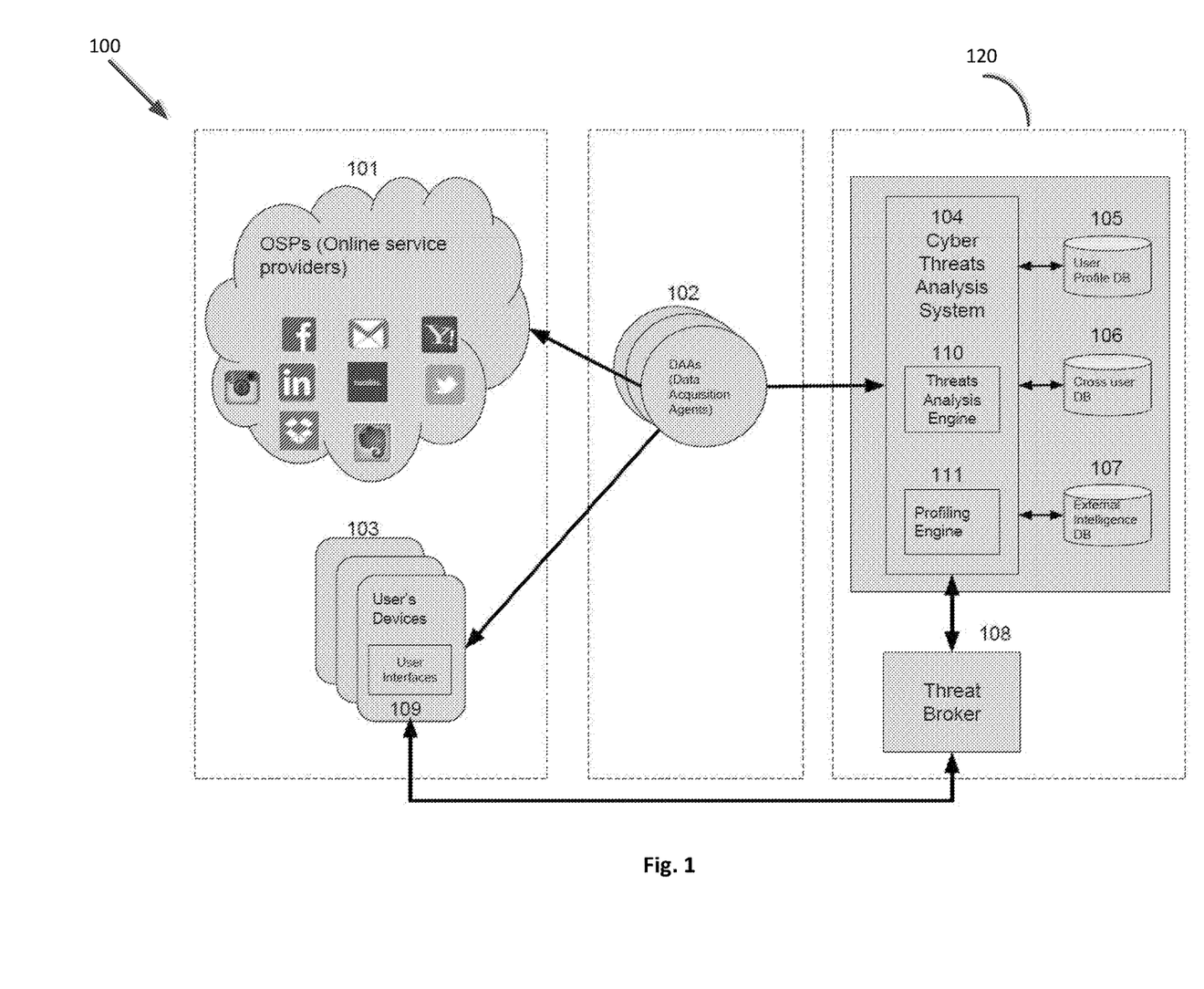
FIG. 1 is a block diagram showing an exemplary system that provides security against unauthorized access to a user's online services and to their data.

FIG. 1. is a block diagram showing an exemplary system 100 that provides security against unauthorized access to a user's online services and to their data, such as email accounts, social accounts, files hosting and sharing accounts and other online accounts. These accounts are usually protected using the traditional protection methods. Among those methods: user authentication using credentials (username and password authentication, two factor authentication etc.), and methods that are used and deployed on the service provider side like profiling the user accesses (user fingerprinting), firewall, antivirus etc.

The system of the present invention comprises mechanisms 102 that extract data from online services provided by OSPs (Online Service Providers) 101 that are in use by the user. These data extraction mechanisms, are the DAAs 102, which stands for Data Acquisition Agents. The DAAs interact with the OSPs through different interfaces including various protocols, APIs, SDKs etc. Through these interfaces the DAAs collect data of interest from the OSPs. The DAAs also interacts with electronic user communication devices 103, such as a Personal Computer (PC), a smartphone, wearable devices, or any type of electronic communication device, to extract additional data of interest. The data collected by the DAAs is then sent to the System Server 120, which comprises a Cyber Threats Analysis System (CTAS) 104 and a Threat Broker 108. The mission of Cyber Threats Analysis System (CTAS) 104 is to analyze the data received from the DAAs and determine whether it introduces a threat to the user account or data. If the CTAS 104 determines that a threat is introduced, it hands over the control to the Threat Broker 108 to decide how to handle that threat, how to externalize this risk and to enable remediation for it. The Threat Broker 108 can act in several ways; one of them, for example, is to inform the user about the threat that his accounts and data are facing through the User Interfaces 109. The User Interfaces 109 could be a software client on a mobile device, a software client on a PC, a Web client interface etc. The Threat Broker 108 could decide to send, for example, push messages through the User Interfaces 109 or can inform the user using e-mail, sms etc. The Threat Broker 108 could act upon a threat in any other ways as well. For instance, it could inform the online service provider about the threat, inform an IT or security specialist that could help the user with the threat and so on. The Threat Broker 108 can also offer remediation steps for the user through the User Interfaces 109. Steps like changing OSPs password, close all active connections to the OSP, report about the threat to the OSP. This remediation steps can either be performed by the user with the guidance of the User Interface 109 or invoked automatically for the user by Threat Broker 108. The user will also be able, through the User Interface 109, to advise the CTAS 104 about a threat alert he has received. The CTAS 104 in turn will use the user advice to improve threat identification for any future data that will be collected. The user either by acknowledging the threat and handling it or by reporting that it is not a threat but some irregular action he made in his accounts, will make the CTAS 104 learn and improve the threat identification process and the databases.

The data collected by the DAAs 102 can be very diverse, and of many kinds. It is collected through any available interface to the OSPs 101 and to the user communication devices 103. Qualifying the collected data as relevant to the system and to the CTAS 104, is by examining its security applicability, namely, if it has a security perspective from which the system can deduce the security condition of the user accounts and his data, or identify a threat to the user accounts and his data. As long as the data can be used for a security analysis, it will be collected by the DAAs. The data collected by the DAAs is mostly related to user activities in his accounts (login, post, mail, upload etc.), his stored data in the account (files, shared data etc.), his account settings (rules on the account, locale, language, customization etc.) and so on. The DAAs also collect data from the user communication devices 103, such as GPS (Global Positioning System), locale, time zone and so forth.

The data collected can be roughly divided into three categories, although not limited to them only. The categories are: session data, behavioral data and content data.

Session data includes data like IPs that were used to login to the OSPs 101, locations that the OSPs were logged from, devices that were used to login to the OSPs, browser types and browser signature that was used to login to the OSPs and more.

Behavioral data consist of data that indicates the user behavior on the OSPs. For instance, usual time of activities in the OSPs, average activities count per time frame (e.g. post on Facebook, send mail with Gmail), rules that the user enforced on the OSPs (e.g. delete mails of particular subject), languages that are used by the user when interacting with the OSPs etc.

Content data consists of data such as identifying template of malicious posts in the OSPs, malicious URLs found in content of the OSPs (posted by the user or not), malicious files found in the OSPs, and other sensitive data found in the user's data in the OSPs.

The data is collected by the DAAs and passed over to the CTAS 104 where it is analyzed and inspected for threats posed to the user's accounts and data. The data of the DAAs is analyzed and inspected using three main databases, which are constantly being built, enhanced and refined. The databases are: User Profiles DB 105, Cross User's DB 106 and External Intelligence DB 107. One aspect of the threat analysis module 110 is comparing the data arrived from the DAAs against already known data about the user. This method is usually referred to, in computer security, as anomaly detection method, meaning, the system needs first to learn and classify the user's online identity and online behavior (on the OSPs) and is doing so using the Profiling Engine 111. The data received from the DAAs, mainly from two of the data categories mentioned, which are session and behavioral categories, is used in this mission. Session data and behavioral data are collected from all user OSPs and devices to build a User Profile DB 105 that represents the known normal user identity and behavior. This profile building is preliminary for the threat analysis that depends on anomaly detection, and is known as a learning period or a training period. This profile is built from data like user's typical IPs, user's typical browsers, user's typical devices, user's typical activity times on the OSPs, user's typical posts, user's typical sequence of actions in the OSP etc. The profile is built per each single OSP (e.g. Facebook profile) and for all the user's OSPs together, meaning a combined profile that is built from data received from all OSPs. This data is normalized and aggregated to one profile that is relevant for all OSPs. This makes the profile hold two kinds of data, one is specific for an OSP and the second a cross OSPs profile data. This will enable the Threat Analysis Engine 110 to analyze data and find anomalies not only according to the specific analyzed OSP (e.g. Google) but also according to a profile that was learnt from the user normal identity and behaviour on all of his OSPs (i.e. Google, Facebook, Dropbox etc.). In other words, data that is received for threat analysis and is extracted by a DAA from an OSP (e.g. Dropbox) will be analyzed according to the known OSP (Dropbox) user profile and according to the profile built from all user OSPs normalized data, known as the cross OSPs user profile. Each characteristic gathered in the profile is also given a weight. This weight represents the certainty level that the system has regarding this characteristic as matching the user identity and behavior (profile). For example, if a user is used to log in to an OSP with the same browser over and over again, this characteristic will gain weight over time; if a user's characteristic manifests itself as a sequence of actions he is doing repeatedly (like sending email to two persons and deleting it afterwards), this will gain weight over time. The profile characteristics, however, that appear seldom, will be degraded over time and finally will be perished. During the end of the initial profile learning period, the profile will be cleansed from characteristics that either appeared very few times or are not in coherence with most valid characteristics in the profile. This will narrow down the deviation of the profile and give a more consistent profile. The basic analysis of the Threat Analysis Engine 110 is finding similarities and/or discrepancies between the characteristics received and deduced from a DAA data and the past learnt characteristics residing in the User Profile 105. Threat Analysis Engine 110 decisions about new DAA data could lead to two outcomes: First, If characteristics similarity is established, it will be used to enhance and improve the profile with the new data. Second, If there is an anomaly or discrepancy between the new DAA data and the user profile indicating a threat, it will trigger an action through the Threats Broker component 108 to inform the user about the threat. The user's reaction to this will be reported back to the CTAS 104 and the Profiling Engine 111 and will be used to improve the profile and reduce false positive threat alerts.

Another database that is used by the Cyber Threat Analysis System 104 is the Cross User DB 106. This DB harnesses the power of knowledge extracted from all the users in system. This DB 106 is built also using the Profile Engine 111 from knowledge acquired in the User Profiles DB 105. Whereas the User Profile DB 105 holds characteristics that are specific to one user (Cross his OSPs), the Cross User DB 106 holds characteristics that are generalized and can be applied to a group of similar users. Since most of the users' activities on their online accounts can be grouped to similar use cases, one can learn about legitimate user activities or behavior and conclude to other groups of users. Meaning, a known usage characteristic for the online account (OSP) in a single user profile, if it is spotted in other users as well, can be applied for as a group characteristic and used to analyze future activities. A group of users could be either all users or users divided by some properties like age, gender, occupation etc. (will be referred to as group properties). The Profiling Engine 111 scans periodically the User Profile DB 105, or is invoked upon new data insertion to the User Profile DB 105 and scans it for similarity in characteristics between users. When finding a similar characteristic between users these users are also characterized by group properties likes age, gender etc.

EXAMPLES

1. The Profiling Engine 111 has concluded that an OSP (e.g. Instagram) user rarely deletes more than one post per day; this could make a group characteristic that relates to all of that OSP's users.

2. The Profiling Engine 111 concluded by comparing User Profiles 105 characteristics that users who use two OSPs (i.e. Google and Facebook) usually do not send one OSP mail (e.g. Google) to more than five recipients.

3. The Profiling Engine 111, by inspecting user profiles, detected that many users reported back to the Threat Broker 108 on an alert they got from it that it is indeed a non-legitimate activity in their OSPs. That activity could include details like IP. This IP will be aggregated in the Cross User DB 106 and will be used to identify illegitimate activities for other users if they were done from this IP.

The Cross User DB 106 contains profiles that are cross users and cross OSPs and are applicable to a group of users that share the same properties (i.e. age, gender etc.). The group profile characteristics are also weighted in regard to their significance or weight in the user profiles from which they were collected. Hence, the Cross User characteristics will be also degraded over time, and calculated on each scan.

In contrast to these DBs (User Profile DB 105 and the Cross User DB 106), the third DB that is utilized by the Cyber Threat Analysis System 104 is the External Intelligence DB 107. While the previously described DBs are built from learning user activities and behavior patterns on the OSPs, DB 107 is built and aggregated from external open and closed sources; external sources from which the system collects and aggregates known threats to users' online accounts and data. Non-limiting examples for these kinds of data are:

1. Malicious hosts IPs aggregated by crawling underground hackers' sites.
2. Anonymous proxy nodes scraped from online sources (i.e. Tor exit nodes list)
3. Malicious URLs (i.e. Google Safe Browse API)
4. Phishing mail templates and scam mail templates.
5. Known malicious files' signatures.

Upon receiving a new data from the DAAs 102, the Threat Analysis System 110 compares it, if relevant data for comparison exists on DB 107. For example, a DAA sends data containing a last login IP of a user. The IP is matched against the Malicious hosts' IPs. If a match is found, the user is obviously facing a threat and will be notified about the threat and will be presented with remediation options through the Threat Broker 108.

Figure 2:
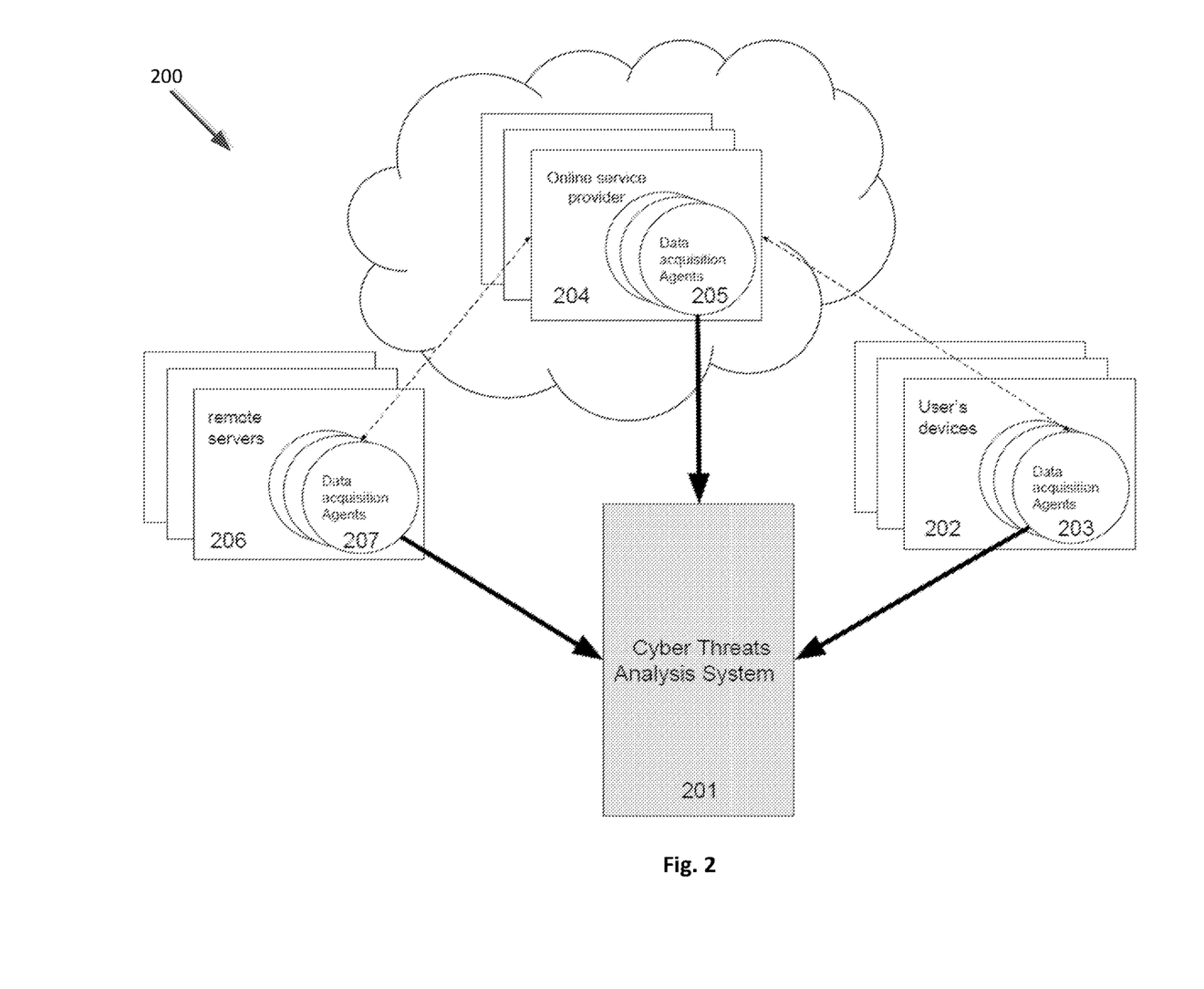
FIG. 2 Is a block diagram showing an example of the DAAs data acquisition mechanism.

FIG. 2. Is a block diagram 200 showing an example of the DAAs 102 data acquisition mechanism. It depicts the DAAs deployment options and their interfaces to their sources, which are the OSPs and the user communication devices. As stated already the DAAs 102 are the mechanisms that extract data from online services 101 that are in use by the user and from the user communication devices. This data reaches its destination in the CTAS 104 for profiling the user and analyzing threats to his online data and accounts. These mechanisms can use a variety of interfaces and protocols to connect with the user OSPs and with the user communication devices in order to extract the data of interest. Some of the options are:

1. Automated HTTP (Web scraping). Get information as the user would have done when interacting with the OSP web interface. This kind of data extraction requires login to the service as the user with the user's credentials.
2. Utilizing OSPs API to extract data of interest. For instance: Gmail API. Generally, these APIs utilize OAuth protocol for authenticating and retrieving data on behalf of the user.
3. OSPs SDKs, for example Dropbox sync SDK, will be used for implementation of a software component that will receive ongoing data about user's files.
4. OSPs plugin or add-ons, for instance Gmail contextual gadget, which is installed in Gmail's web interface and can extract data on user's emails.
5. OSPs supported protocols such as IMAP for Google, Yahoo and Outlook, which can retrieve e-mails content and metadata.
6. Software components native to the user's devices iOS/Android/Desktop for extracting data accessible by devices like physical locations, IPs, network data etc.

As seen in FIG. 2, these DAA mechanisms can be deployed in various ways:

1. The DAAs 203 can be deployed on the user's devices 202 as a part of the user application. From there they can extract data of interest either from the devices themselves or by negotiating with the OSPs 204 interfaces (e.g. API, Web scraping). The data will then be sent to the Cyber Threats Analysis module 201 of system server 120.
2. The DAAs 205 deployed on the OSPs 204 themselves, obtaining data of interest from the OSPs and sending it to the Cyber Threats Analysis module 201 of system server 120.
3. The DAAs 207 deployed on remote servers 206 dedicated for the DAAs mission of obtaining the data of interest from the OSPs 204, using various methods and interfaces (API, SDK, Web scraping etc.) and pushing the data to the Cyber Threats Analysis module 201.

The deployment options of the DAAs as mentioned above are selected while taking into consideration various parameters. Following are some of the consideration when deploying DAAs:

1. Some DAAs could be technically deployed only on user's devices 202. For instance, a DAA that retrieves user's GPS location.
2. DAAs that utilize CPU or are IO intensively will be deployed on remote servers 206 and not on user's devices 202 in order to save user's resource (battery, bandwidth etc.).
3. DAAs that could be deployed in more than one way will give this DAA redundancy for fault tolerance. For example, a DAA that uses an OSP API might reside on user's devices 202 or dedicated remote servers 206 utilizing the OAuth protocol to access this API. Another example is a DAA that uses SDK (e.g. Dropbox sync SDK), which can be implemented both on remote servers and on user's devices.
4. DAAs that require user's credentials, like web scraping of web pages of an OSP that are guarded by credentials (user name and password), will be deployed preferably on user's devices 202. This to ensure that there will be no need to compromise the user's credentials and send them to remote servers or store them on a remote server.
5. Some DAAs are based on technology that is integrated and deployed on OSPs platform 204 like a Facebook app or a Gmail sidebar gadget, which integrates in Gmail web app and can act upon a login action to the Gmail web interface.

Considerations like the above and more are taken into account when determining the deployment method of each DAA. The considerations are specific for each DAA that is created and take into account its technology, its purposes, the data it should obtain, the security issues it might raise and so forth.

Figure 3:
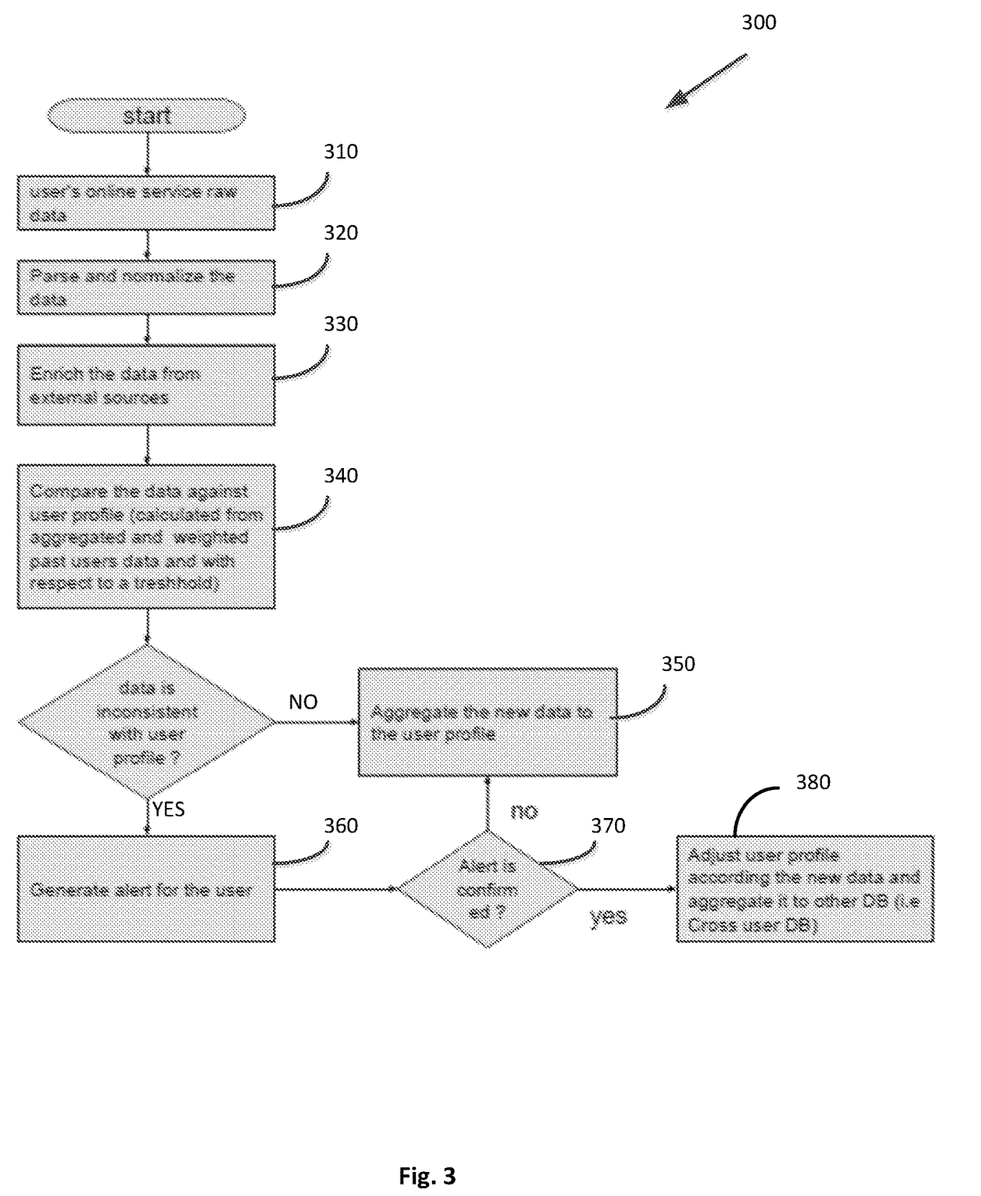
FIG. 3 is a flowchart showing the data flow taking place in the Cyber Threats Analysis module in a one user-cross service scenario.

FIG. 3 is a flowchart 300 showing the data flow taking place in the Cyber Threats Analysis module 104 in a one user-cross service scenario. This scenario depicts the analysis of a DAA 102 data received by the CTAS 104 to determine the risk it presents to the user in respect to the user profile in DB 105 and to enhance the user profile in DB 105 further more. This DB as stated before is built using aggregated data from all the user's OSPs.

In step 310 Threat Analysis Module 110 receives user's online service provider (OSP) 101 raw data (data that was obtained by the DAAs mechanisms 102). The raw data may contain information about login IP, location, device etc. In step 320 module 110 parses and normalizes the received data. As mentioned above, this scenario is based on utilizing the user profile DB 105 which is built from normalized, aggregated and weighted data from all OSPs of a single user. Hence, data that is compared against this DB and aggregated to this DB must be normalized after it is parsed from the raw data as it comes from the OSP. For instance, let us assume we got data about a login to Gmail service from "London in the UK". This data should be normalized in a way that we can compare it to data we received before from Facebook OSP about a login made from "London, UK" and that was aggregated to the DB before. If the Threat Analysis engine 110 detects that "London, UK" is not a common access location for this user and was not registered as an accessed location for the user by any other OSP or as a legitimate access in the recent time with a level of confidence (using a threshold on the weighted data), the system might raise an alert. In step 330 the normalized data is enriched from external sources. For example, if the data received by the CTAS 104 is an IP used to login to an OSP (i.e. Yahoo), this IP data will be enriched with new data like the ISP which this IP belongs to and what is the location associated with this IP. Finally, the enriched data (the data with the new data deduced from it) is compared (step 340) against user profile stored in User Profile DB 105. If the data is determined to be consistent with the user profile, meaning for example that the IP is registered as a legitimate IP, or the ISP is a well-known ISP for this user learnt from other accesses from other OSPs and was accessed in the recent past with some threshold, then the new data is aggregated to the user profile (step 350). Otherwise, the Threat analysis engine 110 will raise an alert and initiate the Threat Broker 108 to generates an alert to the user communication device 109 (step 360). The user feedback on the alert 370, either dismissing it as false alert or approving it to be a real alert will be sent back to the CTAS 104. There the profile engine 111 will update the user profile DB 105 in accordance. Either aggregating it to the profile 350 in case it is false alert or in case of real alert, adjusting the profile data according to it 380 and registering the alert to the DB to be use in other analyses of the Threat analysis engine 110, like aggregating it in the Cross user DB 106.

Figure 4:
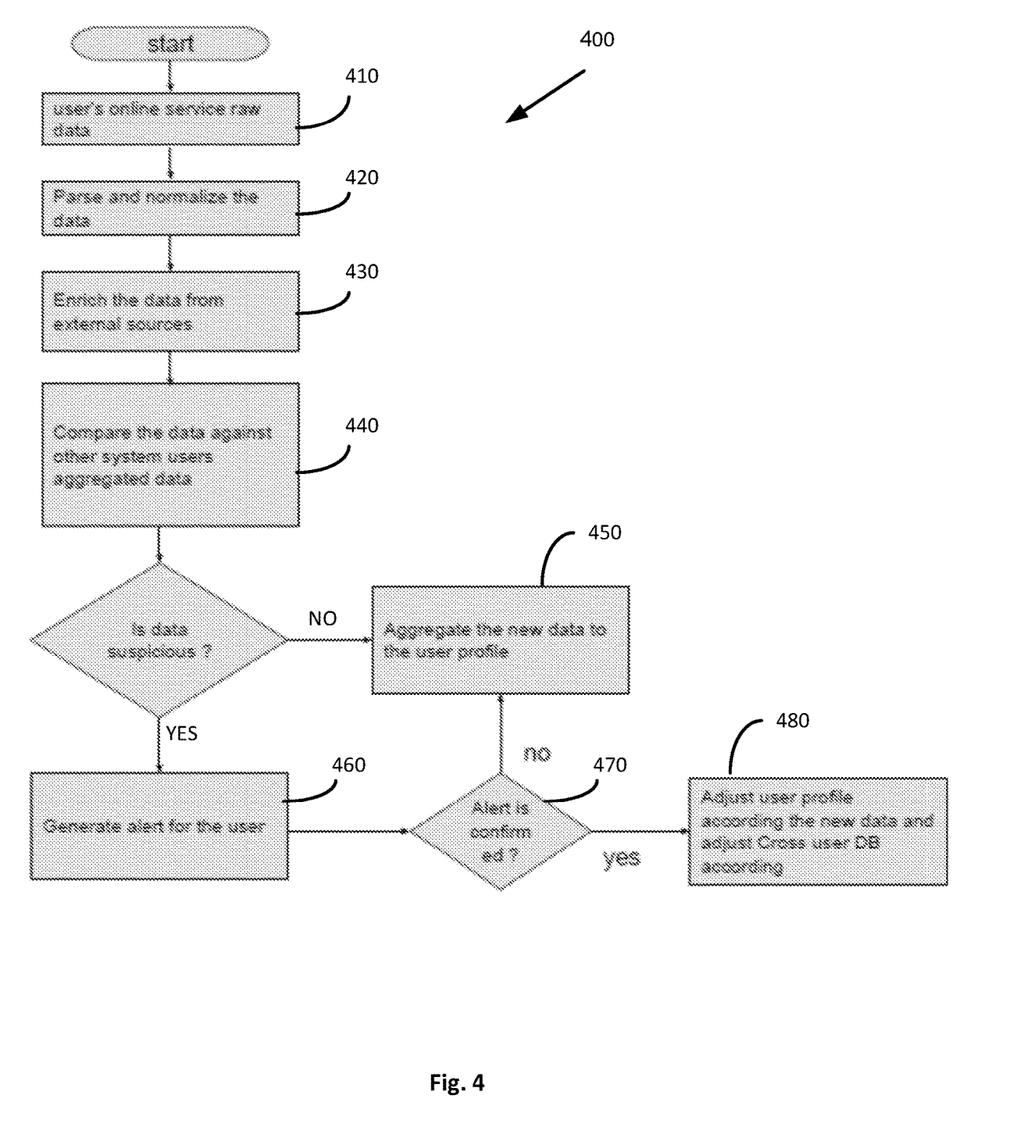
FIG. 4 is a flowchart showing the data flow taking place in the Cyber Threats Analysis module in a cross users-cross service scenario.

FIG. 4 is a flowchart 400 showing the data flow taking place in the Cyber Threats Analysis module 104 in a cross users-cross service scenario. This scenario depicts the analysis of a DAA 102 data received by the CTAS 104 and compared against the Cross User DB 106, which is a DB collected and aggregated from all users and all their services (OSPs) utilizing what is known as crowdsourcing.

In step 410 Threat Analysis Module 110 receives user's raw OSP data. In step 420 module 110 parses and normalizes the received data in the same manner described in flowchart 300. In step 430 the normalized data is enriched from external sources, again in a manner similar to the description in flowchart 300. Then the data is compared (step 440) against other users' aggregated data in the cross user DB 106. For example, let us assume that the data received is an IP that was used for login to the user's OSP Dropbox. The IP is compared with an aggregated list of IPs that were reported by other users as suspicious IPs. Meaning, the system has reported alerts to those users on this IP and the users confirmed that the alert is genuine. The system aggregated this IP to a list of known suspicious IPs in step 380 in flowchart 300. If the IP received is found on the list of the IPs with a threshold (meaning the IP was reported as suspicious more than five times for example), then the Threat analysis engine 110 will raise an alert and initiate the Threat Broker 108 to generates an alert to the user communication device 109 (step 460). Otherwise, it will be aggregated by the user profile DB 105 as a legitimate activity (step 450). The user feedback on the alert 470, either dismissing it as false alert or approving it to be a real alert will be sent back to the CTAS 104. There the profile engine 111 will update the user profile DB 105 and the Cross user DB 106 in accordance. In case it is a false alert, it will be aggregated to the user profile DB 105 and the Cross users DB 106 will mark this IP as less suspicious or not suspicions at all depending on the number of reporting users and thresholds that are set for this update. In case of real alert, the user's profile data will be adjusted accordingly 480 and he Cross user DB 106 will be enhanced with this new data.

Figure 5:
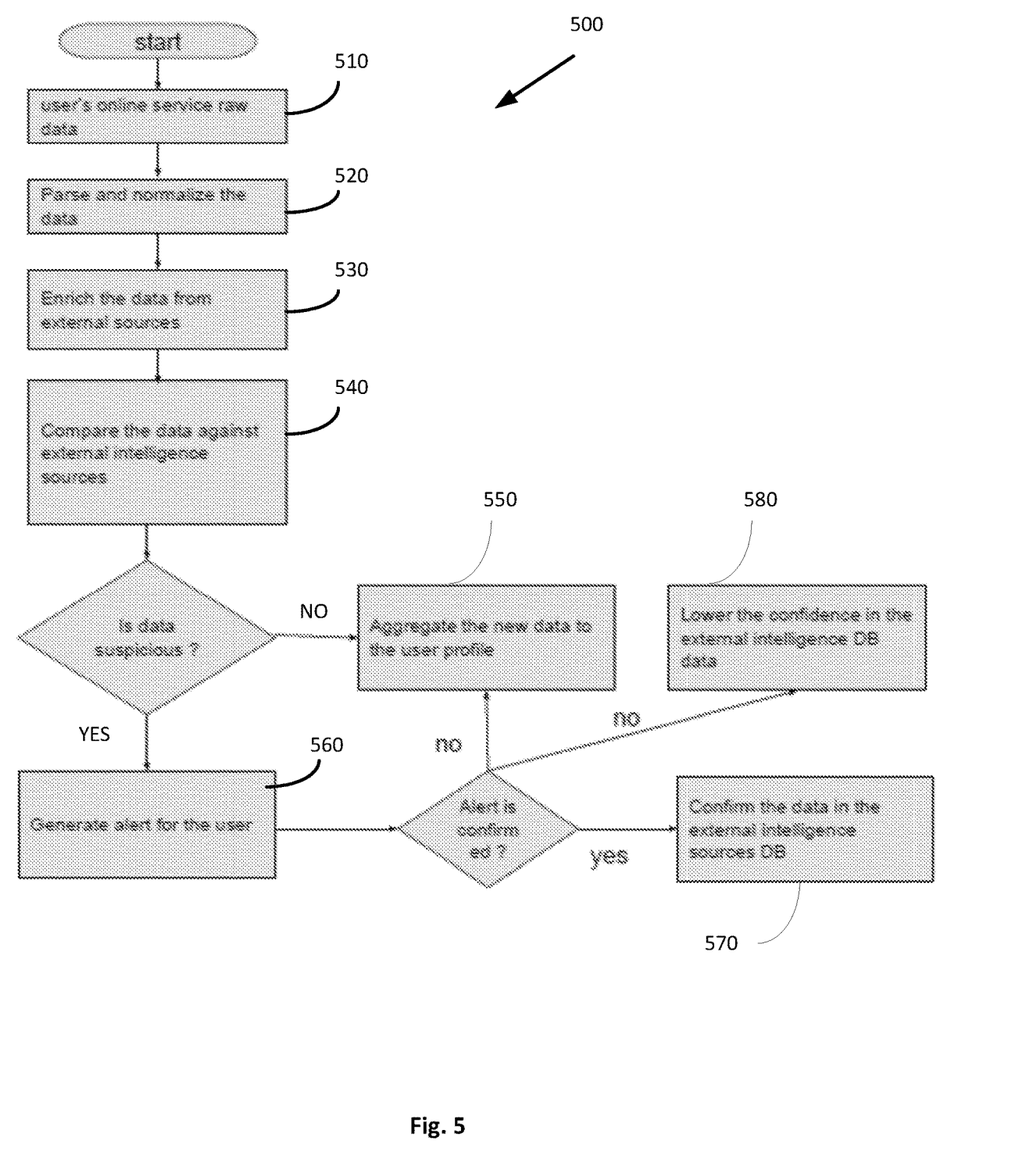
FIG. 5 is a flowchart showing the data flow taking place in the Cyber Threats Analysis module in a one user-external intelligence scenario.

FIG. 5 is a flowchart 500 showing the data flow taking place in the Cyber Threats Analysis module 104 in identifying suspicious activities using external intelligence sources 107 scenario. DB 107 encompasses data gathered from external sources to the system and contains information about threats posed on a user's online services. It holds data such as known malicious IPs, know anonymous proxies IPs (like Tor exit nodes), malicious URLs, malicious files, scam templates and so forth.

In step 510 Threat Analysis Module 110 receives user's OSP raw data. In step 520 module 110 parses and normalizes the received data to fit for a comparison against the External intelligence sources DB 107. For example, extracting a URL from a Gmail mail content for comparing with the known malicious URL list. In step 530 the normalized data is enriched from external sources as needed for further comparison against the External Intelligence Sources DB 107. Finally, the data is compared (step 540) against the External Intelligence Sources DB 107. If the data is found in DB 107 and hence, poses a threat to the user, the Threat analysis engine 110 will initiate an alert and the Threat Broker 108 will generates an alert to the user communication device 109 (step 560). For example, a file is uploaded to Dropbox, when checking the file name and signature against the External Intelligence Sources it turns out to be suspicions and an alert will be generated 560. Another example, an IP used to login to Gmail is detected as a Tor node exit IP; again, this will generate an alert to the user. If the user confirms the alert, it will be used to enhance the confidence in the data in the External Intelligence Source DB 107 (step 570). However, if a user dismisses the alert as a false alert, it will be used to enhance the user profile 550 and to lower the confidence in the corresponding data in the External Intelligence Sources DB 107 (step 580).

The invention claimed is:

1. A user-centric cyber security system, comprising:
a plurality of DAAs (Data Acquisition Agents) configured to collect data relative to activities of a user in online accounts from a plurality of user's OSPs (Online Service Providers) and from a plurality of electronic user communication devices, wherein the data received from said plurality of user's OSPs is used to build a combined profile of a user that holds two kinds of data, one specific for each specific OSP among said plurality of user's OSPs and the second a cross OSPs profile data, thus said combined profile represents the identity and usage characteristic of said user in online accounts; and
a system server communicating with said plurality of DAAs, said system server configured to receive said collected data from said plurality of DAAs, analyze said data for threats by identifying deviation from normal usage characteristic of said user, alert said user accordingly, receive feedback from said user regarding said alert and improve said threat analysis using said user's feedback.

2. The system of claim 1, wherein said system server comprises:

a CTAS (Cyber Threats Analysis System) configured to analyze said data and to determine whether it introduces a threat to said user's account or data; and a Threat Broker configured to determine a course of action relating to a determined threat.

3. The system of claim 2, wherein said course of action comprises informing the user about the threat that his accounts and data are facing through at least one User Interface.

4. The system of claim 3, wherein said at least one User Interface is selected from the group consisting of software client on a mobile device, software client on a PC and Web client interface.

5. The system of claim 2, wherein said course of action is selected from the group consisting of informing at least one of said user's OSPs (Online Service Providers), informing an IT (Information Technology) and informing a security specialist.

6. The system of claim 2, wherein said Threat Broker is further configured to offer remediation steps to said user.

7. The system of claim 6, wherein said remediation steps are selected from the group consisting of changing OSP's password, closing all active connections to the OSP and reporting the threat to the OSP.

8. The system of claim 1, wherein said data collected by said DAAs is selected from the group consisting of user activities in his accounts, user's stored data in the accounts and user's accounts settings.

9. The system of claim 1, wherein said data collected by said DAAs comprises at least one of session data, behavioral data and content data.

10. The system of claim 9, wherein said session data comprises at least one of IPs (Internet Protocols) used to login to the OSPs, locations the OSPs were logged from, devices used to login to the OSPs and browser types and signatures that were used to login to the OSPs.

11. The system of claim 9, wherein said behavioral data comprises at least one of usual time of activities in the OSPs, average activities count per time frame, rules the user enforced on the OSPs and languages used by the user when interacting with the OSPs.

12. The system of claim 9, wherein said content data comprises at least one of template of malicious posts in the OSPs, malicious URLs found in content of the OSPs and malicious files found in the OSPs.

13. The system of claim 1, wherein said system server comprises a User Profiles database, a Cross User's database and an External Intelligence database.

14. The system of claim 13, wherein said user profiles database is continuously updated and comprises at least one user characteristic selected from user's typical IPs, user's typical browsers, user's typical devices, user's typical activity times on the OSPs, user's typical posts and user's typical sequence of actions in the OSP.

15. The system of claim 14, wherein said user profiles database comprises profile data specific for each one of said plurality of OSPs and a cross OSPs profile data.

16. The system of claim 14, wherein each one of said at least one user characteristic comprises a weight representing the degree to which said characteristic matches the user's identity and behavior.

17. The system of claim 16, wherein said analyzing comprises finding similarities and/or discrepancies between the characteristics received and deduced from a DAA data and the characteristics residing in the User Profile.

18. The system of claim 13, wherein said Cross User database is continuously updated and comprises generalized characteristics applicable to a group of similar users.

19. The system of claim 13, wherein said External Intelligence database comprises external sources from which the system collects and aggregates known threats to users' online accounts and data.

20. The system of claim 19, wherein said known threats are selected from the group consisting of: malicious hosts IPs, anonymous proxy nodes, malicious URLs, phishing and scam mail templates and known malicious files signatures.

21. The system of claim 1, wherein at least one of said plurality of DAAs is deployed on the user's devices as a part of a user application.

22. The system of claim 1, wherein at least one of said plurality of DAAs is deployed on a user's OSP.

23. The system of claim 1, wherein at least one of said plurality of DAAs is deployed on a remote server.

24. A method of providing user-centric cyber security, comprising:

receiving from at least one DAA (Data Acquisition Agents) raw data collected from at least one user's OSPs (Online Service Providers) and from at least one user's electronic communication device, wherein said raw data relative to activities of a user in online accounts;

building a combined profile of a user from the data received from said user's OSPs, wherein said profile holds two kinds of data, one specific for each OSP and the second a cross OSPs profile data, thus said combined profile represents the identity and usage characteristic of said user in online accounts;

analyzing said data for threats by identifying deviation from normal usage characteristic of said user; and if said analysis indicates that the data is inconsistent with a stored profile of said user, generating a threat alert to said user's device;

receiving feedback from said user regarding said threat alert; and improving said threat analysis using said user's feedback.

25. The method of claim 24, wherein said analyzing comprises:

using said user's profile to normalize said received raw data;

using external sources to enrich said normalized data; and comparing said enriched data to said user's profile.

26. The method of claim 25, further comprising comparing said enriched data to a Cross User database.

27. The method of claim 24, further comprising updating said user's profile according to said feedback.

28. The method of claim 25, further comprising comparing said enriched data to other users aggregated data.

29. The method of claim 24, further comprising determining a course of action relating to a determined threat.

30. The method of claim 29, wherein said course of action comprises informing the user about the threat that his accounts and data are facing through at least one User Interface.

31. The method of claim 30, wherein said at least one User Interface is selected from the group consisting of software client on a mobile device, software client on a PC and Web client interface.

32. The method of claim 31, wherein said course of action is selected from the group consisting of informing at least one of said user's OSPs, informing an IT (Information Technology) and informing a security specialist.

33. The method of claim 24, further comprising offering remediation steps to said user.

34. The method of claim 33, wherein said remediation steps are selected from the group consisting of changing OSP's password, closing all active connections to the OSP and reporting the threat to the OSP.

35. The method of claim 24, wherein said received data is selected from the group consisting of user activities in his accounts, user's stored data in the accounts and user's accounts settings.

36. The method of claim 24, wherein said data is collected from said user's electronic communication devices.

37. The method of claim 24, wherein said data comprises at least one of session data, behavioral data and content data.

38. The method of claim 37, wherein said session data comprises at least one of IPs used to login to the OSPs, locations the OSPs were logged from, devices used to login to the OSPs and browser types and signatures that were used to login to the OSPs.

39. The method of claim 37, wherein said behavioral data comprises at least one of usual time of activities in the OSPs, average activities count per time frame, rules the user enforced on the OSPs and languages used by the user when interacting with the OSPs.

40. The method of claim 37, wherein said content data comprises at least one of template of malicious posts in the OSPs, malicious URLs found in content of the OSPs and malicious files found in the OSPs.

41. One or more computer-storage media embedded with computer-executable instructions, the embedded computer-executable instructions are executed by at least one processor for performing a method of providing user-centric cyber security, comprising:
  receiving from at least one DAA (Data Acquisition Agents) raw data collected from at least one user's OSPs (Online Service Providers) and from at least one user's device, wherein said raw data relative to activities of a user in online accounts;
  building a combined profile of a user from the data received from said user's OSPs, wherein said profile holds two kinds of data, one specific for each OSP and the second a cross OSPs profile data, thus said combined profile represents the identity and usage characteristic of said user in online accounts;
  analyzing said data for threats by identifying deviation from normal usage characteristic of said user; and
  if said analysis indicates that the data is inconsistent with a stored profile of said user, generating a threat alert to said user's device;
  receiving feedback from said user regarding said threat alert; and
  improving said threat analysis using said user's feedback.

* * * * *